US008426119B2

(12) United States Patent
Lai et al.

(10) Patent No.: US 8,426,119 B2
(45) Date of Patent: Apr. 23, 2013

(54) DYNAMIC PROJECTION METHOD FOR MICRO-TRUSS FOAM FABRICATION

(75) Inventors: Yeh-Hung Lai, Webster, NY (US);
Gerald W. Fly, Geneseo, NY (US);
Jeffrey A. Rock, Fairport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 358 days.

(21) Appl. No.: 12/603,147

(22) Filed: Oct. 21, 2009

(65) Prior Publication Data

US 2011/0091813 A1   Apr. 21, 2011

(51) Int. Cl.
*G03F 7/20* (2006.01)
(52) U.S. Cl.
USPC .............................. 430/322; 430/290; 430/396
(58) Field of Classification Search .................. 430/322, 430/290, 397, 394, 311, 396
See application file for complete search history.

(56) References Cited

U.S. PATENT DOCUMENTS

| 6,274,288 | B1 | 8/2001 | Kewitsch et al. | |
|---|---|---|---|---|
| 7,382,959 | B1 | 6/2008 | Jacobsen | |
| 2002/0149751 | A1* | 10/2002 | Bloomstein et al. | 353/122 |
| 2004/0259042 | A1* | 12/2004 | Fritze et al. | 430/394 |
| 2007/0153250 | A1* | 7/2007 | Sewell et al. | 355/67 |

FOREIGN PATENT DOCUMENTS

| CN | 1811599 A | 8/2006 |
|---|---|---|
| CN | 1842746 A | 10/2006 |

OTHER PUBLICATIONS

Microstereolithography: Concepts and applications; Arnaud Bertsch, Paul Bernhard, Philippe Renaud; (c) 2001 IEEE.
Microstereolithography: a Review; Arnard Bertsch, Sebastien Jiguet, Paul Bernhard, Philippe Renaud; Swiss Federal Institute of Technology,(c) 2003 Material Research Society.
Characterisation of Epoxy Resins for Microstereolithographic Rapid Prototyping; C.R. Chatwin, M. Farsari, S. Huang, M.I. Heywood, R.C.D. Young, P.M. Birch, F. Claret-Tournier and J.D. Richardson, School of Engineering, University of Sussex, Falmer, Brighton, UK; (c) 1999 Springer-Verlag London Limited.
Two-Photon Photopolymerization and 3D Lithographic Microfabrication; Hong-Bo Sun, Satoshi Kawata; Depart of Applied Physics, Osaka University, Japan; APS (2004) (c) Springer-Verlag 2004.
Fabrication and moulding of cellular materials by rapid prototyping; J. Stampfl, H. Houad and S. Seidler; Institute of Material Science and Testing, Vienna University of Technology, Austria; R Liska and F. Schwager; Institute of Applied Synthetic Chemistry, Vienna University of Technology, Austria; A Woesz and P Fratzl; Max Planck Institute of Colloids and Interfaces, Germany; Int. J. Materials and Product Technology, vol. 21, No. 4, 2004, (c) Inderscience Enterprises Ltd. Acta Materialia 55 (2007) 6724-6733, Compression behavior of micro-scale truss structures formed from self-propagating polymer waveguides; Alan J. Jacobsen, William Barvosa-Carter, Steven Nutt. Published by Elsevier Ltd.

* cited by examiner

*Primary Examiner* — Kathleen Duda
*Assistant Examiner* — Caleen Sullivan
(74) *Attorney, Agent, or Firm* — Fraser Clemens Martin & Miller LLC; J. Douglas Miller

(57) ABSTRACT

A system for fabricating a radiation-cured component is provided. The system includes a radiation-sensitive material configured to at least one of initiate, polymerize, crosslink and dissociate with exposure to radiation, and at least one radiation source configured to project a radiation beam with a vector that does not intersect the radiation-sensitive material. The system further includes a radiation directing device that is selectively positionable to reflect the radiation beam in a desired direction and expose the radiation-sensitive material to the radiation beam. A method for fabricating the radiation-cured components is also provided.

9 Claims, 3 Drawing Sheets

DYNAMIC PROJECTION METHOD FOR MICRO-TRUSS FOAM FABRICATION

FIELD OF THE INVENTION

The present disclosure relates to a fuel cell component and more particularly to a dynamic masking method for fabricating the fuel cell component.

BACKGROUND OF THE INVENTION

A fuel cell has been proposed as a clean, efficient and environmentally responsible power source for electric vehicles and various other applications. Individual fuel cells can be stacked together in series to form a fuel cell stack for various applications. The fuel cell stack is capable of supplying a quantity of electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: an electrolyte membrane; and a pair of electrodes, including a cathode and an anode. The electrolyte membrane is sandwiched between the electrodes to form a membrane-electrode-assembly (MEA). The MEA is typically disposed between porous diffusion media (DM) such as carbon fiber paper, which facilitates a delivery of reactants such as hydrogen to the anode and oxygen to the cathode. In the electrochemical fuel cell reaction, the hydrogen is catalytically oxidized in the anode to generate free protons and electrons. The protons pass through the electrolyte to the cathode. The electrons from the anode cannot pass through the electrolyte membrane, and are instead directed as an electric current to the cathode through an electrical load such as an electric motor. The protons react with the oxygen and the electrons in the cathode to generate water.

It has been desirable to fabricate the fuel cell and related fuel cell components from radiation-cured structures. The formation of radiation-cured structures such as microtruss structures are described in Assignee's co-pending U.S. patent application Ser. No. 12/339,308, the entire disclosure of which is hereby incorporated herein by reference. The formation of radiation-cured fuel cell structures are further described in Assignee's co-pending U.S. patent application Ser. Nos. 12/341,062 and 12/341,105, the entire disclosures of which are hereby incorporated herein by reference.

Radiation-cured microtruss structures and methodology are described by Jacobsen et al. in "Compression behavior of micro-scale truss structures formed from self-propagating polymer waveguides", Acta Materialia 55, (2007) 6724-6733, the entire disclosure of which is hereby incorporated herein by reference. One particular method and system of creating radiation-cured structures is disclosed by Jacobsen in U.S. Pat. No. 7,382,959, the entire disclosure of which is hereby incorporated herein by reference. Further radiation-cured structures are disclosed by Jacobsen in U.S. patent application Ser. No. 11/801,908, the entire disclosure of which is hereby incorporated herein by reference.

Typically, the radiation-cured structures are formed from radiation-sensitive materials such as radiation-curable materials and radiation-dissociable materials. The radiation-cured structure is generally formed by a method including the steps of: providing the radiation-sensitive material; placing a mask between an at least one radiation source and the radiation-sensitive material, the mask having a plurality of substantially radiation-transparent apertures formed therein; and exposing the radiation-sensitive material to a plurality of radiation beams through the radiation-transparent apertures in the mask. The apertures of the mask may be selected to provide different radiation cured structures. To form complex or multi-layered radiation cured structures, different masks having different apertures are generally sequentially applied. Undesirably, masks must be removed following radiation exposure so that further radiation-cured structure may be fabricated. Since masks typically are placed in physical contact with the radiation-sensitive material, the masks must also be cleaned after use in order to remove residual radiation-sensitive material. Although it is possible to achieve multiple radiation exposures through repeated release and application of masks, this methodology can be quite complicated and costly.

There is a continuing need for an efficient and cost effective system and method for fabricating radiation-cured structures. Desirably, the system and method provide complex or multi-layered radiation-cured structures without employing costly and inefficient masking techniques, processing steps, and cleaning steps.

SUMMARY OF THE INVENTION

In concordance with the instant disclosure, an efficient and cost effective system and method for fabricating radiation-cured structures, and for providing complex or multi-layered radiation-cured structures without employing costly and inefficient masking techniques, processing steps, and cleaning steps, is surprisingly discovered.

In a first embodiment, a system for fabricating a radiation-cured component includes a radiation-sensitive material. The radiation-sensitive material is configured to at least one of initiate, polymerize, and crosslink and dissociate with exposure to radiation. The system further includes at least one radiation source and a radiation directing device. The at least one radiation source is configured to project a radiation beam with a vector that does not intersect the radiation-sensitive material. The radiation directing device is selectively positionable to direct the radiation beam in a desired direction and expose the radiation-sensitive material to the radiation beam.

In another embodiment, a system for fabricating a radiation-cured component includes a radiation-sensitive material configured to at least one of initiate, polymerize, and crosslink and dissociate with exposure to radiation. A first radiation source is disposed adjacent a first side of the radiation sensitive material and configured to project a first radiation beam with a vector that does not intersect the radiation-sensitive material. A second radiation source is disposed adjacent a second side of the radiation sensitive material and configured to project a second radiation beam with a vector that does not intersect the radiation-sensitive material. The system further includes a digital micromirror device having a plurality of micromirrors arranged in an array. The digital micromirror device is disposed adjacent the first radiation sensitive material. Each of the micromirrors is selectively positionable to reflect one of the first and second radiation beams in a desired direction and expose the radiation-sensitive material to one of the first and second radiation beam.

In a further embodiment, a method for fabricating a radiation-cured component includes the steps of: providing a first radiation-sensitive material configured to at least one of initiate, polymerize, and crosslink and dissociate with exposure to radiation; providing at least one radiation source configured to project a radiation beam with a vector that does not intersect the first radiation-sensitive material; providing a radiation directing device that is selectively positionable;

positioning the radiation directing device to direct the radiation beam in a desired direction; exposing the first radiation-sensitive material to the radiation beam directed by the radiation directing device; and forming a first radiation-cured structure of the radiation-cured component.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

Figure 1A:
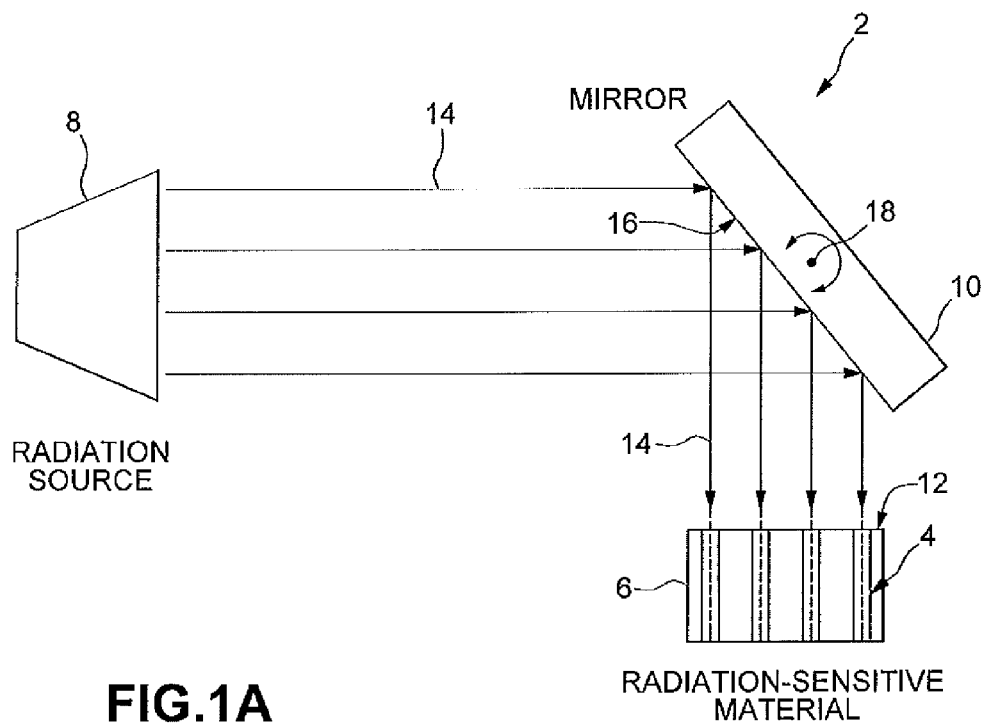
FIG. 1A is a schematic illustration of the system for fabricating radiation-cured structures according to an embodiment the present disclosure, with a radiation directing device shown in an active state.
Figure 1B:
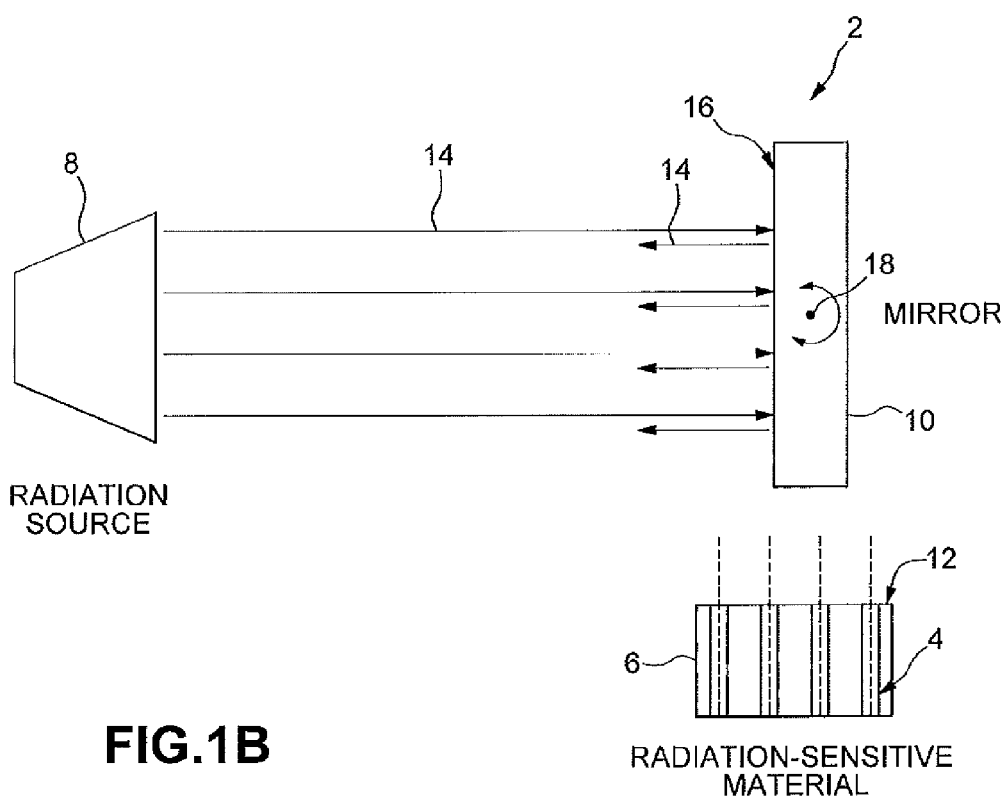
FIG. 1B is a schematic illustration of the system shown in FIG. 1A, with the radiation directing device shown in the inactive state.

FIGS. 1A and 1B show a system 2 for fabricating radiation-cured structures 4 according to the present disclosure. The radiation-cured structures 4 may illustratively be employed as radiation-cured fuel cell components such as diffusion media, bipolar plates, subgaskets, and the like. However, it should be appreciated that the disclosed system 2 and method is not limited to fuel cell components, and may be used for fabrication of radiation-cured structures 4 for other purposes, as desired. The terminology related to the fabrication of radiation-cured structures 4, appropriated herein relative to the present system 2 and method, is further described in Assignee's co-pending U.S. patent application Ser. Nos. 12/339,308, 12/341,062 and 12/341,105, the entire disclosures of which are hereby incorporated herein by reference.

The system 2 includes a radiation-sensitive material 6, at least one radiation source 8, and a radiation directing device 10. The radiation-sensitive material 6 is configured to at least one of initiate, polymerize, and crosslink and dissociate with exposure to radiation. The radiation-sensitive material 6 may be disposed on a substrate (not shown), placed in a container or reservoir if liquid, or provided as a free standing film, depending on the type of radiation-sensitive material 6 selected. The at least one radiation source 8 may be disposed adjacent the radiation sensitive material 6. The radiation directing device 10 may also be disposed adjacent the radiation-sensitive material 6 in a position that facilitates a selective reflection of radiation toward the radiation-sensitive material 6. The radiation directing device 10 is preferably spaced apart from the radiation-sensitive material 6 and disposed, for example, above a surface 12 of the radiation-sensitive material 6. It should be appreciated that the radiation directing device 10 may be horizontally offset from the radiation-sensitive material 6, as desired.

The radiation directing device 10 may include at least one of a mirror 16 and a refractor such as a lens, a prism, and the like. Although the radiation directing device 10 is described further herein having the at least one mirror 16, it should be appreciated that alternate embodiments including the radiation directing device 10 with at least one refractor are within the scope of the instant disclosure The at least one radiation source 8 is configured to project a radiation beam 14 along a vector that does not intersect the radiation-sensitive material 6. The at least one radiation source 8 is desirably configured to project the radiation beam 14 along a vector that intersects the at least one mirror 16 of the radiation directing device 10. It should be appreciated that the radiation may be collimated or partially collimated, as desired. In particular embodiments, the radiation is electromagnetic radiation such as ultraviolet (UV) light, although it is understood that other forms of electromagnetic radiation may also be employed within the scope of the disclosure. The radiation source 8 projects the radiation beam 14 along a vector parallel with the surface 12 of the radiation-sensitive material 6. In another example, the radiation source 8 is disposed below a plane formed by the surface 12 of the radiation sensitive material 6, and may project the radiation beam 14 upward and away from the surface of the radiation-sensitive material 6. It should be appreciated that the radiation source 8 may be placed in other suitable locations to project the radiation beam 14 along the vector that does not intersect the radiation-sensitive material 6, as desired.

In certain examples, the radiation source 8 is pulsable. For example, the radiation source 8 may be rapidly and readily switched on and off. The pulsability of the radiation source 8 facilitates a controlled non-projection of the radiation beam 14 during the positioning of the mirrors 16. One of ordinary skill in the art should understand that by turning off the radiation source 8 during the positioning of the mirrors 16, and turning on the radiation source 8 when the mirrors 16 have been positioned as desired, a formation of undesirable "dragging" radiation-cured structures is militated against.

The radiation directing device 10 of the instant disclosure is configured to selectively direct, for example, by reflection or refraction, the radiation beam 14 from the radiation source 8 to the radiation-sensitive material 6. In particular embodiments, the radiation directing device 10 has at least one mirror 16 disposed adjacent the radiation sensitive material 6 and selectively positionable to reflect the radiation beam 14 in a desired direction. The mirror 16 may be formed from any material able to reflect the radiation beam 14 projected by the radiation source 8. The mirror 16 may have a single, substantially continuous surface or a surface with multiple facets to reflect the radiation beam 14 in the desired direction. For example, the desired direction may be one of toward the radiation sensitive material 6 for exposure of the radiation-sensitive material to the radiation beam 14, and away from the radiation-sensitive material 6 to militate against exposure of the radiation-sensitive material 6 to the radiation beam 14.

Referring to FIGS. 1A and 1B, the radiation directing device 10 is selectively positionable from an active state to an inactive state. An example of the active state is shown in FIG. 1A and includes a position configured to reflect the radiation beam 14 toward the radiation-sensitive material 6. An example of the inactive state is shown in FIG. 1B and includes a position configured to reflect the radiation beam away from the radiation sensitive material 6. The radiation directing device 10 may also be selectively positionable to a plurality of states within the active state, in order to reflect the radiation beam 14 in a plurality of desire directions toward the radiation sensitive material 6. For example, the radiation directing device 10 may have multiple active states at different angles that reflect the radiation beam 14 at different directions.

The radiation directing device 10 may be positionable through the use of at least one programmable controller (not shown) in electrical communication therewith. The controller may provide fine position control of a motor, for example, an electric stepper motor, coupled to the at least one mirror 16. Other motors or means suitable for providing finely controlled positioning of radiation directing device 10 may also be employed.

The positioning of the radiation directing device 10 may include at least one of linear and angular displacement. As an example of linear displacement, the mirror 16 may be configured to slide forward and backward to selectively reflect the radiation beam 14. In a particularly illustrative example, the mirror 16 is rotatable about an axis 18 to facilitate the selective positioning of the mirror 16. In another illustrative example, the mirror 16 is configured to rotate about more than one axis 18. The axis 18 may be disposed at an end of the radiation directing device 10, such as in the form of a hinge coupled to the radiation directing device 10. The axis 18 may be disposed intermediate the ends of the radiation directing device 10, such as in the form of an axle coupled to the radiation directing device 10. Where the mirror 16 is positioned by rotation, it should be understood that the mirror 16 is spaced apart from the surface 12 of the radiation-sensitive material 6 at a distance sufficient to allow the rotation to occur without the mirror 16 contacting the surface 12.

An alignment of the radiation directing device 10 may be tracked and a repositioning of the radiation directing device 10 used to easily correct for drifts in performance of the system 2 over time. For example, a quality control sensor or inspection process may be employed to determine if the angles of the fabricated radiation-cured structures 4 are within acceptable tolerance, and the mirror 16 repositioned as necessary where undesirable drift has occurred. Where the drift is a result of movement of an underlying substrate or carrier in a continuous operation method, it should be appreciated that the employment of the at least one mirror 16 advantageously allows for real time corrections and minimizes downtime of the system 2.

Figure 2:
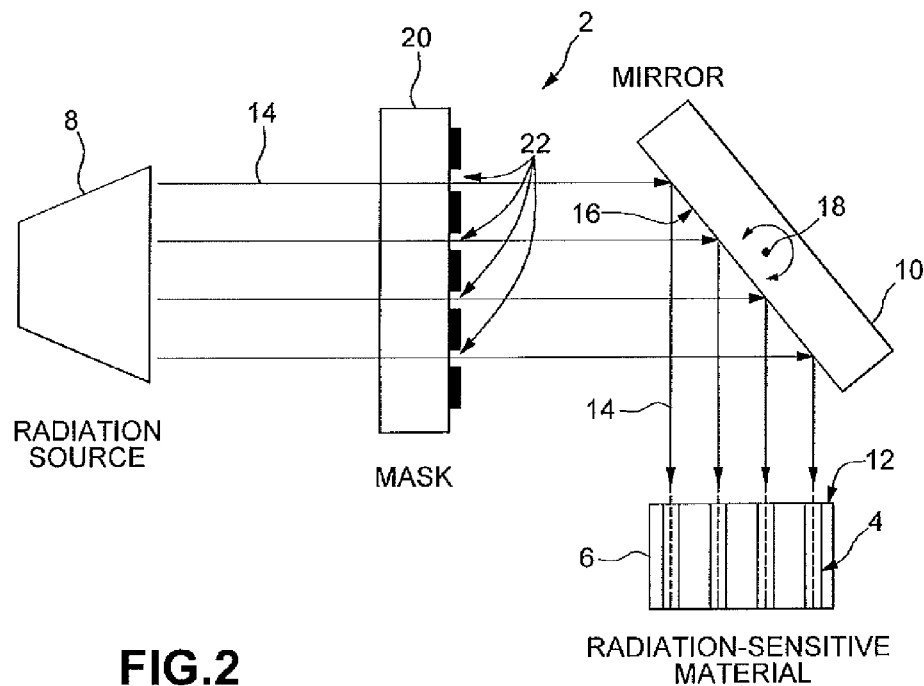
FIG. 2 is a schematic illustration of the system shown in FIG. 1A, further having a mask disposed between a radiation source and the radiation directing device.

With reference to FIG. 2, the system 2 may further include a mask 20 disposed between the at least one radiation source 8 and the radiation directing device 10. The mask 20 may be directly disposed on radiation directing device 10 or spaced apart from the radiation directing device 10 as shown in FIG. 2. In another embodiment, the mask 20 is spaced between radiation directing device 10 and the radiation-sensitive material 6, the mask 20 being spaced apart from the radiation-sensitive material 6. The mask 20 may further be integrally formed with the mirror 16 by providing a selectively reflectable mirrored surface. In a particular embodiment, the mask 20 has a plurality of substantially radiation-transparent apertures 22 or openings formed therein. The apertures may be substantially radiation-transparent apertures 22 formed in an otherwise opaque or radiation-blocking material coated on a surface of the mask 20, for example. The apertures 22 or openings formed in the mask 20 have shapes that provide radiation beams 14 to form radiation cured structures 4 having desired cross-sectional shapes. In one embodiment, the apertures 22 are in the form of substantially circular holes that provide radiation beams 14 to form radiation-cured columns with substantially circular or elliptical cross-sectional shapes. In another embodiment, the apertures 22 are elongate slots that provide radiation beams 14 to form radiation-cured walls with substantially rectangular cross-sectional shapes. The mask 20 may be formed from a plane of glass or a Mylar® plastic sheet, for example, and facilitate the formation of a plurality of radiation beams 14. It should be understood that multiple masks 20 may be employed, and that the masks 20 may be interchanged throughout the fabrication process, as desired.

Figure 3:
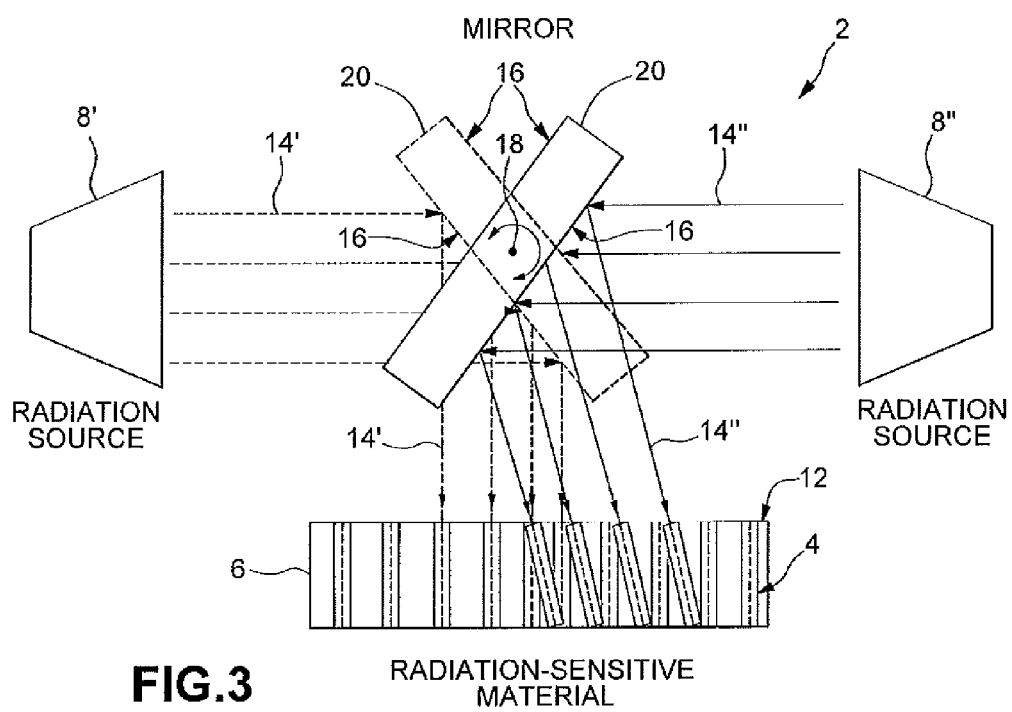
FIG. 3 is a schematic illustration of the system for fabricating radiation-cured structures according to another embodiment of the present disclosure, with a pair of radiation sources.
Figure 4:
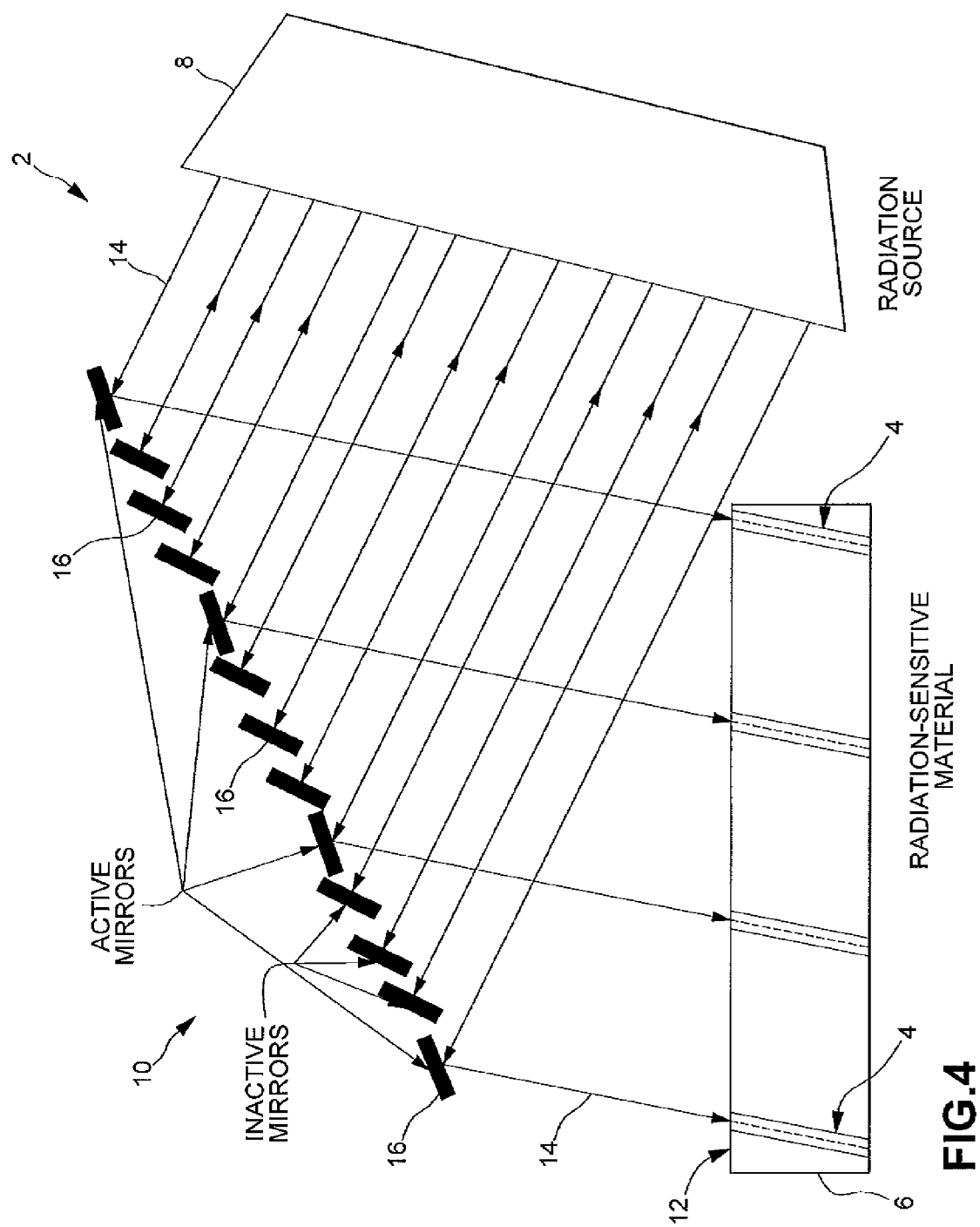
FIG. 4 is a schematic illustration of the system for fabricating radiation-cured structures according to a further embodiment of the present disclosure, with a plurality of selectively positionable mirrors.

Referring to FIGS. 3 and 4, like structure repeated from FIGS. 1A, 1B, and 2 have the same reference numeral and a prime (') or double prime (") for purpose of clarity. The at least one radiation source 8 may include a first radiation source 8' and a second radiation source 8". The first radiation source 8' is disposed on a first side of the radiation sensitive material 6. The second radiation source 8" is disposed on a second side of the radiation sensitive material 6. The radiation directing device 10 is disposed between the first and second radiation sources 8', 8" and is selectively positionable to reflect the first and second radiation beams 14', 14" from either of the first and second radiation sources 8', 8". It should be understood that additional radiation sources 8 disposed on additional or same sides of the radiation sensitive material 6, may be employed as desired.

As shown in FIG. 4, the radiation directing device 10 may also include a plurality of the mirrors 16. Each of the mirrors is selectively positionable to reflect the radiation beam 14 in the plurality of desired directions. As a nonlimiting example, the plurality of mirrors 16 is arranged in an array disposed at least partially above the radiation-sensitive material 6. Multiple arrays may be employed during the formation of the radiation-cured structure 4. For example, the radiation directing device 10 may include three different arrays of the mirrors 16. Each of the three different arrays may be provided with a predetermined tilt in order to facilitate the formation of radiation-cured structures 4 having desired angles and shapes. In another example, the entire array, as well as the individual mirrors 16, may be positionable as desired.

In a particularly illustrative embodiment, the radiation directing device 10 is a digital micromirror device (also known as "DMD") and the at least one mirror 16 include a plurality of micromirrors arranged in the array. The digital micromirror device is an optical semiconductor that has on its surface a plurality of microscopic mirrors arranged in a rectangular array, which may correspond to the shape of the desired radiation-cured structure 4 to be formed. The micromirrors can be individually rotated ±12°, to the active and inactive states. In the active state, the radiation beams 14 from the radiation source 8 are reflected to the radiation-sensitive material 6. In the inactive state, the radiation beams 14 are directed elsewhere, for example, to a heatsink (not shown) disposed adjacent to the system 2.

The use of the digital micromirror device as the radiation directing device 10 may be particularly advantageous as the digital micromirrors may be toggled on and off very quickly, allowing for a fine control and formation of the radiation-cured structure 4.

The micromirrors may illustratively be formed from aluminum, and may be up to about 20 micrometers in average width. The micromirrors may have other materials and dimensions suitable for use in the digital micromirror device, as desired. In a particular embodiment, each micromirror is hingedly mounted on a yoke which in turn is connected to two support posts by compliant torsion hinges. In this type of hinge, the axle is fixed at both ends and twists in the middle.

Two pairs of electrodes may be employed to control the position of the micromirror by electrostatic attraction. Each pair has one electrode on each side of the hinge, with one of the pairs positioned to act on the yoke and the other acting directly on the micromirror.

Equal bias charges are applied to both sides simultaneously to hold the micromirror in the desired position. To position the micromirrors, a required state for each micromirror may be first loaded onto a controller which is in electrical communication with the electrodes. Once the required states for each micromirror have been loaded, the bias voltage is removed and the micromirrors are positioned as desired. The micromirror may be again held in position through application of equal bias changes when the desired position is achieved, and until a next positioning of the micromirror is desired.

One particular system for fabricating the radiation-cured component includes the radiation-sensitive material 6, the first radiation source 8' disposed adjacent the first side of the radiation sensitive material 6 and configured to project the first radiation beam 14', the second radiation source 8" disposed adjacent the second side of the radiation sensitive material 6 and configured to project the second radiation beam 14", and the radiation directing device 10. In this particular system 2, the radiation directing device 10 is the digital micromirror device. The digital micromirror device may be disposed adjacent the radiation sensitive material 6 and each of the micromirrors individually selectively positionable to reflect one of the first and second radiation beams 14', 14" in a desired direction to selectively expose the radiation-sensitive material 6 to the first and second radiation beams 14', 14".

The present disclosure further includes a method for fabricating the radiation-cured component. The method includes the steps of: providing the radiation-sensitive material 6; providing the at least one radiation source 8, for example, disposed adjacent the radiation sensitive material 6; providing the radiation directing device 10, for example, disposed adjacent the radiation sensitive material 6; and positioning the at least one mirror 16 to direct, for example, by reflection or refraction, the radiation beam 14 in a desired direction. The radiation-sensitive material 6 is then exposed to the radiation beam 14 directed by the at least one mirror 16. It should be appreciated that the exposure time may be lengthened or shortened as desired.

Where the radiation-sensitive material 6 is only initiated by the exposure to the radiation beam 14, it should be appreciated that the forming of the first radiation-cured structure 4 may include a post-processing step of heating the radiation-sensitive material 6 to complete at least one of polymerization, crosslinking, and dissociation of the radiation sensitive material 6. Where the radiation-sensitive material 6 is one of polymerized, crosslinked, and dissociated by the radiation beam 14, and where post-processing steps such as heating the initiated radiation-sensitive material have occurred, a step of removing excess or uncured radiation-sensitive material 6 is also employed. The first radiation-cured structure 4 of the radiation-cured component is thereby formed.

The step of positioning the radiation directing device 10 may include the step of rotating the mirror 16 from the active state to the inactive state as described hereinabove. The step of positioning the radiation directing device 10 may include the step of pulsing or switching off the at least one radiation source 8 while the radiation directing device 10 is being positioned. The deactivation of the at least one radiation source 8 while the radiation directing device 10 is moving militates against a formation of dragging structures within the first radiation-cured structure 4.

With renewed reference to FIG. 2, the method of the present disclosure may further include a step of placing the first mask 20' between the at least one radiation source 8 and the radiation directing device 10. Likewise, a second mask 20" (and additional masks 20) may be placed between the at least one radiation source 8 and the radiation directing device 10, or other suitable locations, following the step of exposing the first radiation-sensitive material 6' to the radiation beam 14. Illustratively, the second mask 20" has a plurality of substantially radiation-transparent apertures 22 that are different from the substantially radiation-transparent apertures 22 of the first mask 20'. Different radiation-cured elements within the first radiation-cured structure may thereby be formed.

It should be understood that the method of the present disclosure can advantageously be employed to form multi-layered radiation-cured structures 4. For example, the method may further include the steps of: providing the first radiation-cured structure 4' as described hereinabove; applying a second radiation-sensitive material 6" to the first radiation-cured structure 4'; positioning the at least one mirror 16 to reflect the radiation beam 14 in another desired direction; and exposing the second radiation-sensitive material 6" to the plurality of radiation beams 14, wherein a second radiation-cured structure 4" different from the first radiation-cured structure 4' is formed.

As described hereinabove, the system 2 may include the plurality of mirrors 16 arranged in an array and disposed above the radiation-sensitive material 6. Where the system has such a configuration, the step of positioning the mirrors 16 may include individually positioning a first portion of the mirrors 16 to reflect the radiation beam 14 in the first desired direction and individually positioning a second portion of the plurality of mirrors 16 to reflect the radiation beam 14 in a second desired direction.

In a further embodiment where the at least one radiation source 8 includes the first radiation source 8' and the second radiation source 8", the method may further comprise the steps of: applying the second radiation-sensitive material 6" to the first radiation-cured structure 4' following the formation of the first radiation-cured structure 4; positioning the at least one mirror 16 to reflect the first radiation beam 14 in the first desired direction; exposing the second radiation-sensitive material 6" to the first radiation beam 14'; positioning the at least one mirror 16 to reflect the second radiation beam 14" in a second desired direction different from the first desired direction; and exposing the second radiation-sensitive material 6" to the second radiation beam 14", wherein the second radiation-cured structure 4" different from the first radiation-cured structure 4' is formed.

The first and second radiation-sensitive materials 6', 6" may have different radiation sensitivities, for example, as described in Assignee's co-pending U.S. application Ser. No. 12/339,308, the entire disclosure of which is hereby incorporated herein by reference. It should be understood that, in lieu of applying the second radiation-sensitive material 6" to the first radiation-cured structure 4' following the formation thereof, the present method may include the steps of applying the second radiation-sensitive material 6" to the first radiation-sensitive material 6' and selectively exposing the first and second radiation-sensitive materials 6', 6" to different radiation types to form different radiation-cured structures 4', 4" in the respective materials. The first and second radiation-sensitive materials 6', 6" may be configured to form different radiation-cured structures 4', 4" based on the exposure patterns of the different radiation types directed to the first and second radiation-sensitive materials 6', 6", for example, by the at least one radiation directing device 10.

As certain nonlimiting examples, there can be more than one type of radiation source 8 used with the same set of mirrors 16, either side-by-side or joined with a partially reflective beam splitter set up backwards. The radiation source 8 may be capable of producing different types of radiation. Filters may also be inserted in front of a broad-spectrum radiation source 8 to provide more than one type of radiation. Alternatively, a second set of the mirrors 16 may be used with other radiation sources 8. Different radiation-cured constructs, having different patterns, may thereby be simultaneously formed in the different first and second radiation-sensitive materials 6', 6", as desired.

One of ordinary skill in the art should appreciate that the system 2 and method of the present disclosure mitigate the need for costly and inefficient masking techniques, processing steps, and related cleaning steps, typically associated fabrication of radiation-cured structures 4. Where masks 20 are employed under the present invention, the masks 20 are spaced apart from the radiation-sensitive material 6 and therefore do not require regular cleaning as with known fabrication methods. Similarly, the employment of mirrors 16 to direct the radiation beams 14 allows for the rapid and cost-effective formation of desired radiation-cured structures 4.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for fabricating a radiation-cured component, the method comprising the steps of:
   providing a first radiation-sensitive material configured to at least one of initiate, polymerize, crosslink and dissociate with exposure to radiation;
   providing an at least one radiation source configured to project a radiation beam with a vector that does not intersect the first radiation-sensitive material;
   providing a radiation directing device that is selectively positionable from an active state to an inactive state, the radiation directing device in the active state configured to receive the radiation beam projected by the at least one radiation source directly from the at least one radiation source and direct the radiation beam toward the first radiation-sensitive material, and the radiation directing device in the inactive state configured to receive the radiation beam projected by the at least one radiation source directly from the at least one radiation source and direct the radiation beam away from the first radiation-sensitive material;
   positioning the radiation directing device to direct the radiation beam in a desired direction;
   projecting the radiation beam with the vector that does not intersect the first radiation-sensitive material toward the radiation directing device;
   exposing the first radiation-sensitive material to the radiation beam directed by the radiation directing device; and
   forming a first radiation-cured structure of the radiation-cured component.

2. The method of claim 1, wherein the step of positioning the radiation directing device includes the steps of rotating at least one of a mirror and a refractor to the active state from the inactive state before the forming of the first radiation-cured structure, and rotating the at least one of the mirror and the refractor to the inactive state from the active state after the forming of the first radiation-cured structure.

3. The method of claim 2, wherein the radiation directing device in the inactive state is configured to receive the radiation beam projected by the at least one radiation source directly from the at least one radiation source and direct the radiation beam back toward the at least one radiation source.

4. The method of claim 1, wherein the step of positioning the radiation directing device includes the step of pulsing off the at least one radiation source while the radiation directing device is being positioned, wherein a formation of dragging structures within the first radiation-cured structure is militated against.

5. The method of claim 1, further comprising the step of placing a first mask between the at least one radiation source and the radiation directing device, the first mask having a plurality of substantially radiation-transparent apertures.

6. The method of claim 5, further comprising the step of placing a second mask between the at least one radiation source and the radiation directing device following the step of exposing the first radiation-sensitive material to the radiation beam, the second mask having a plurality of substantially radiation-transparent apertures different from the substantially radiation-transparent apertures of the first mask.

7. The method of claim 1, further comprising the steps of:
   applying a second radiation-sensitive material to the first radiation-cured structure;
   positioning the radiation directing device to direct the radiation beam in another desired direction; and
   exposing the second radiation-sensitive material to the radiation beam, wherein a second radiation-cured structure different from the first radiation-cured structure is formed.

8. The method of claim 1, wherein the radiation directing device includes a plurality of mirrors arranged in an array and disposed above the first radiation-sensitive material, wherein the step of positioning the mirrors includes individually positioning a first portion of the mirrors to direct the radiation beam in a first desired direction and individually a second portion of the plurality of mirrors to direct the radiation beam in a second desired direction.

9. The method of claim 1, wherein the at least one radiation source includes a first radiation source and a second radiation source, the first radiation source disposed adjacent a first side of the first radiation sensitive material and the second radiation source disposed adjacent a second side of the first radiation sensitive material, the first radiation source configured to project a first radiation beam with a vector that does not intersect the first radiation-sensitive material, the second radiation source configured to project a second radiation beam with a vector that does not intersect the first radiation-sensitive material, the radiation directing device disposed between the first and second radiation sources and selectively positionable to direct the radiation beams from either of the first and second radiation sources, the method further comprising the steps of:
   applying a second radiation-sensitive material to the first radiation-cured structure following the formation of the first radiation-cured structure;
   positioning the radiation directing device to direct the first radiation beam in a first desired direction;
   projecting the first radiation beam with the vector that does not intersect the first radiation-sensitive material from the first radiation source toward the radiation directing device;
   exposing the second radiation-sensitive material to the first radiation beam;

positioning the radiation directing device to direct the second radiation beam in a second desired direction different from the first desired direction;

projecting the second radiation beam with the vector that does not intersect the first radiation-sensitive material from the second radiation source toward the radiation directing device; and exposing the second radiation-sensitive material to the second radiation beam, wherein a second radiation-cured structure different from the first radiation-cured structure is formed.

\* \* \* \* \*